Jan. 7, 1958 E. W. DUNBAR 2,818,603
MACHINE FOR MOLDING RUBBER SHOE-SOLES
Filed April 12, 1955 4 Sheets-Sheet 1

Inventor
Ernest W. Dunbar
by Roberts Cushman Grover
Atty's

Jan. 7, 1958 E. W. DUNBAR 2,818,603
MACHINE FOR MOLDING RUBBER SHOE-SOLES
Filed April 12, 1955 4 Sheets-Sheet 2
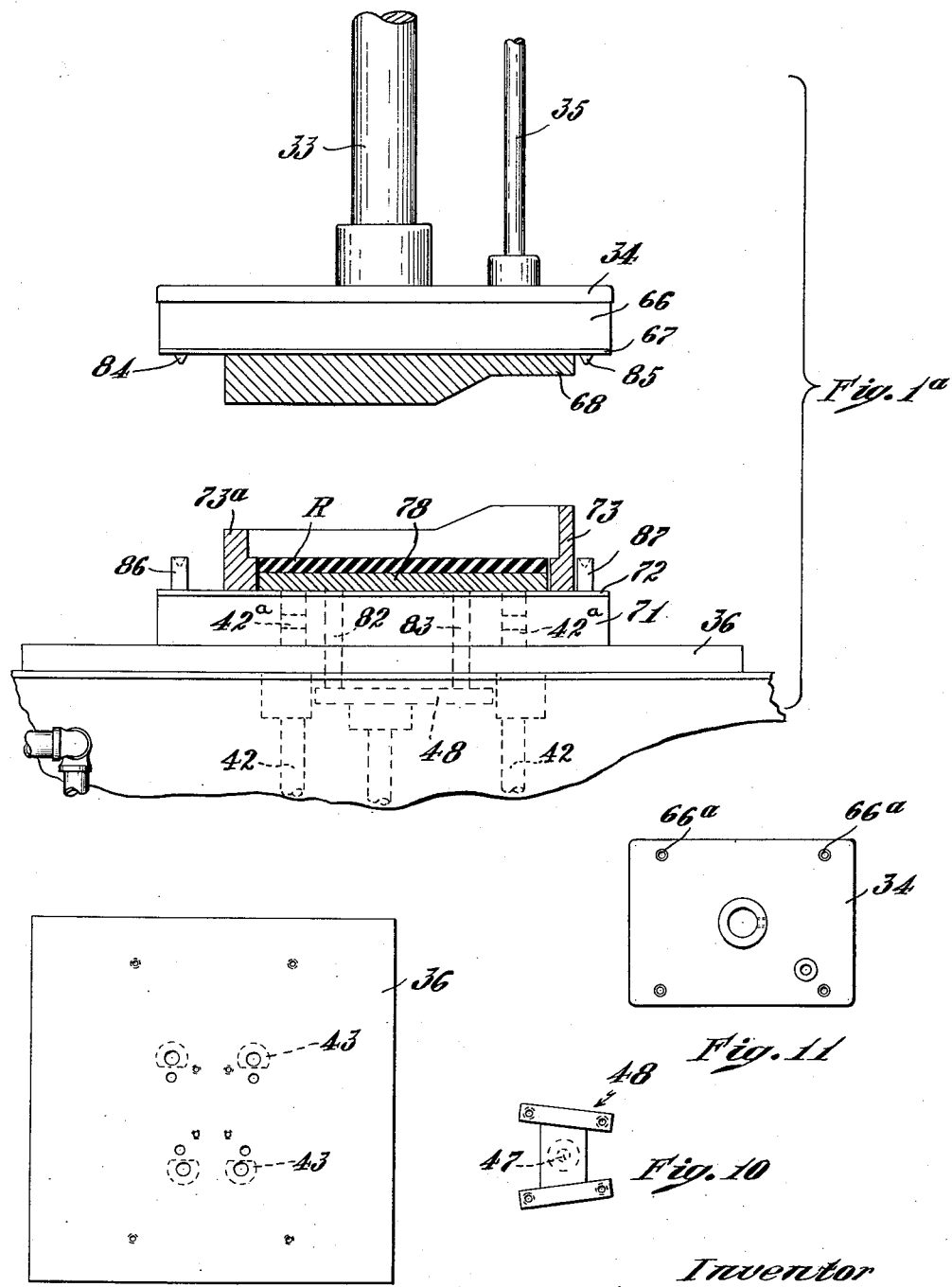
Inventor
Ernest W. Dunbar
by Roberts Cushman Crowe
Att'ys Jan. 7, 1958     E. W. DUNBAR     2,818,603
MACHINE FOR MOLDING RUBBER SHOE-SOLES
Filed April 12, 1955     4 Sheets-Sheet 3

Inventor
Ernest W. Dunbar

Jan. 7, 1958     E. W. DUNBAR     2,818,603
MACHINE FOR MOLDING RUBBER SHOE-SOLES
Filed April 12, 1955     4 Sheets-Sheet 4
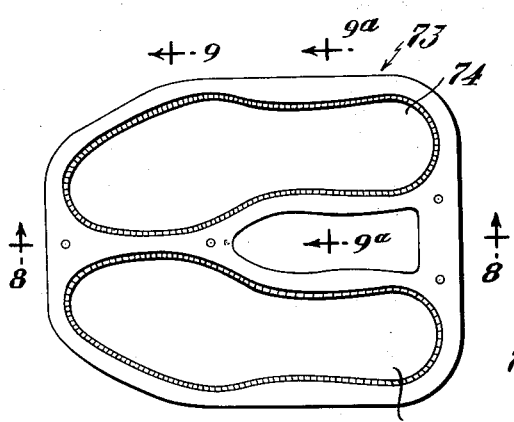
Fig. 3
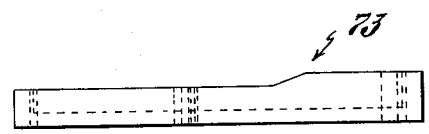
Fig. 3a
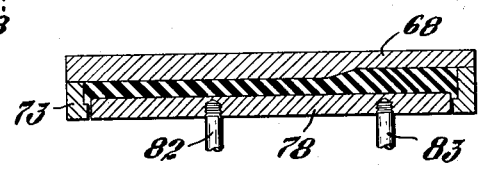
Fig. 8
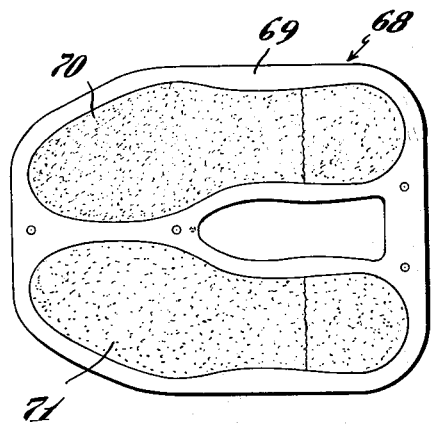
Fig. 6
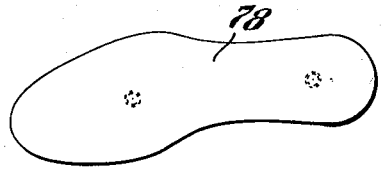
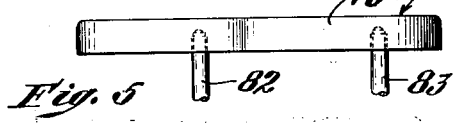
Fig. 4
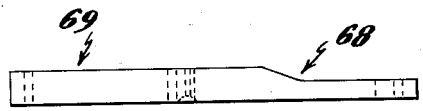
Fig. 7
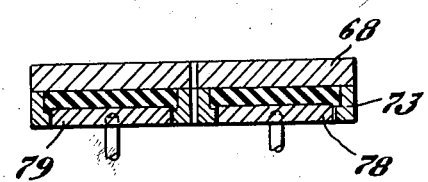
Fig. 9
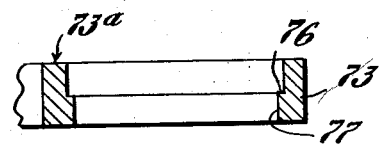
Fig. 9a
Inventor
Ernest W. Dunbar
by Roberts Cushman & Crowe
Attys United States Patent Office 2,818,603
Patented Jan. 7, 1958

2,818,603

MACHINE FOR MOLDING RUBBER SHOE-SOLES

Ernest W. Dunbar, Taneytown, Md., assignor to Cambridge Rubber Company, Taneytown, Md., a corporation of Maryland Application April 12, 1955, Serial No. 500,881

7 Claims. (Cl. 18—17)

This invention pertains to the manufacture of rubber soled footwear, and more especially to novel apparatus for use in the preparation of rubber soles.

According to one customary prior practice in the manufacture of rubber soled footwear, for instance, shoes having cloth or leather uppers and rubber outer soles, the soles are prepared, for example, by molding and are fully vulcanized before assembling them with the other parts of the shoe. Since a fully vulcanized sole has a dense smooth surface film, it is necessary as a step preparatory to the cementing of the sole to the bottom structure of the sole to change the character of the upper surface of the sole in such a way as to enable the cement used in uniting the parts to secure to good and permanent grip upon the sole. For this purpose it is usual to subject the upper surface of the sole to an abrading operation or chemical action, such as to remove its dense surface film and roughen it prior to the application of the cement. This roughening operation is time-consuming and expensive. The present invention has for one of its objects the provision of apparatus whereby rubber soles may be so prepared, in readiness for assembly with the bottom structure of a lasted shoe, as to avoid the necessity for roughening the surface as is usual according to customary prior procedure. A further object is to provide apparatus of simple construction and portable type which may be located most conveniently within the shoe manufacturing plant, so that rubber soles may be prepared and supplied to the shoe making operator with the least delay or trouble. A further object is to provide apparatus for making rubber soles, and which is so designed as to make possible the preparation of soles ready for assembly with the other parts of a lasted shoe in a much shorter time than has heretofore been necessary. A further object is to provide sole making apparatus which requires relatively little floor space and which is readily movable from place to place and which only requires for its operation a convenient source of electrical current. A further object is to provide apparatus operative to make soles from rubber dough (preferably in pellet form) by a molding operation whereby the molded sole, while capable of being handled, is not fully vulcanized so that its upper surface, without roughening or other treatment, is capable of making a good adhesive bond with the cement employed in attaching it to the bottom structure of the shoe. Other and further objects and advantages of the invention will be pointed out in the following more detailed description and by reference to the accompanying drawings, wherein Fig. 1 is a diagrammatic front elevation showing apparatus embodying the present invention, but omitting the mold employed in shaping the rubber;

Fig. 3 is a plan view of the lower portion or frame of the mold employed;

Fig. 3a is a side view of the frame of Fig. 3;

Fig. 4 is a plan view of a plate which normally forms the major part of the bottom wall or floor of one of the mold cavities;

Fig. 5 is a side elevation of the plate of Fig. 4 with its actuating rods broken off;

Fig. 6 is a view of the under side of the top or cover plate of the mold;

Fig. 7 is a side elevation of the cover plate when upside down as it is shown in Fig. 6;

Fig. 8 is a vertical section through the assembled mold parts at the plane of the line 8—8 of Fig. 3, showing a charge of rubber within the mold cavity;

Fig. 9 is a similar vertical section on the line 9—9 of Fig. 3;

Fig. 9a is a fragmentary, vertical section through the frame or lower member only of the mold, substantially on the line 9a—9a of Fig. 3;

Fig. 10 is a plan view of the vertically movable platen which actuates the plate of Fig. 5 to eject the molded sole;

Fig. 11 is a plan view of the vertically movable platen to which the top or cover plate of the mold is attached; and Fig. 12 is a plan view of the plate which forms the support for the lower member of the mold.

Figure 1:
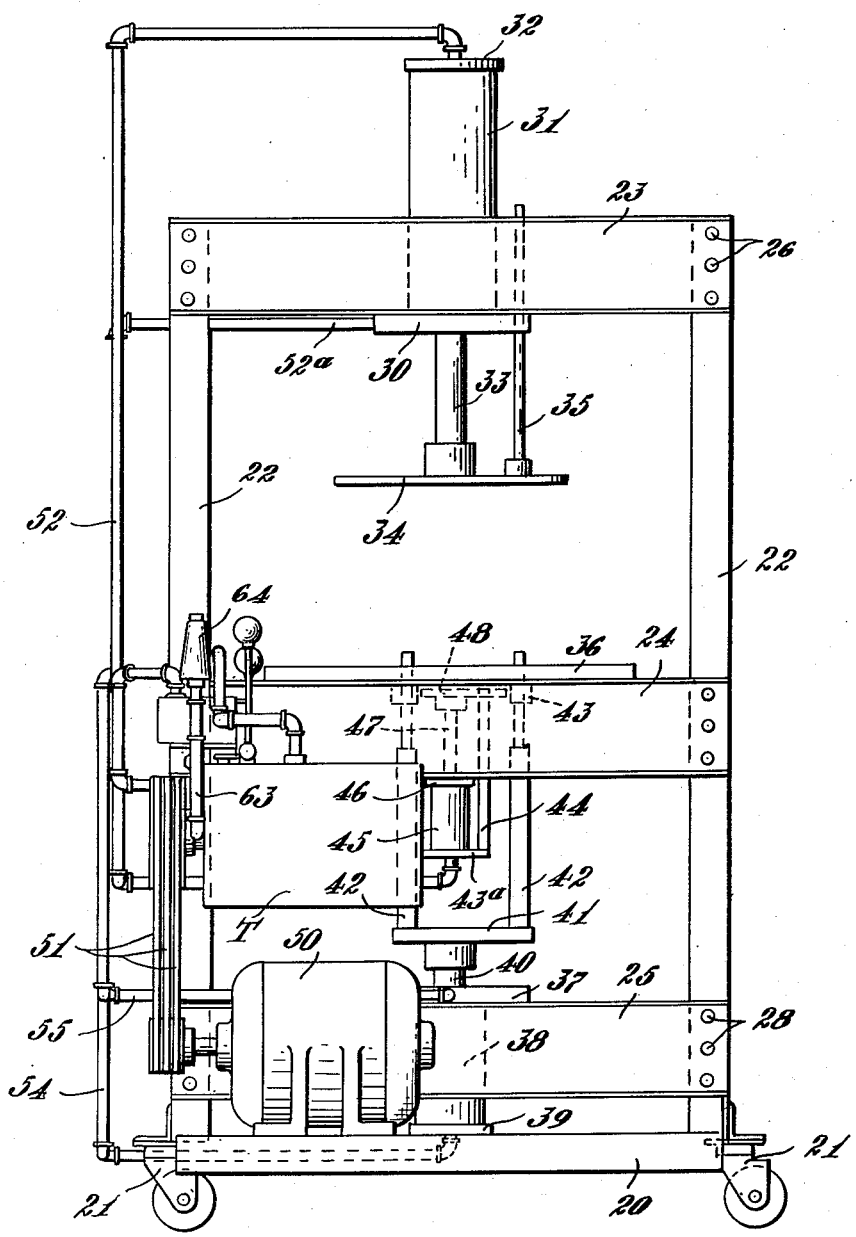
Fig. 1a is a fragmentary elevation, to larger scale than Fig. 1, showing the mold (in section) mounted in the machine and with a charge of rubber in the lower part of the mold.

Referring to the drawings, the numeral 20 designates the substantially rectangular base, here shown as constructed of angle bar stock and having casters 21 of conventional type at its four corners to facilitate moving the apparatus from place to place. Four vertical bars or columns 22 are fixed at their lower ends to the base. The two columns at one side are rigidly connected (Fig. 1) by horizontal channel bars 23, 24 and 25, while the two columns at the opposite side (Fig. 2) are connected by similar channel bars 23a, 24a and 25a. At the upper part of the framework thus constructed the channel bars 23 and 23a are tied together by bolts 26, each bolt passing through a tubular spacer 27, while at the lower part of the frame the channel bars 25 and 25a are tied together by bolts 28 passing through spacer sleeves 29.

A heavy rigid plate 30 (Fig. 1) is bolted to the lower flanges of the channel bars 23 and 23a and supports and forms the lower head of a vertical cylinder 31 having a head 32 at its upper end. A piston (not shown) slides within the cylinder 31 and has a rod 33 which passes down through a hole in the plate 30 and has attached to its lower end of rigid platen member 34. To prevent rotation of the member 34 a rod 35, eccentric with relation to the piston rod 33, is fixed at its lower end to the member 34 and passes, with a sliding fit, through an opening in the plate 30 beyond the confines of the cylinder 31.

A horizontal mold supporting bed plate or table 36 is mounted on the upper flanges of the channels 24 and 24a. Another horizontal plate 37 is mounted on the upper flanges of the channel members 25 and 25a and forms the upper head of a vertical cylinder 38 coaxial with the cylinder 31 and having a lower head 39. A piston (not shown) in the cylinder 38 has a rod 40 to whose upper end is fixed a platen 41. Four rigid, vertical, lifter bars 42 rest at their lower ends on the platen 41 and have their upper end portions arranged to slide in vertical bores in guide bosses 43 integral with and extending down from the plate 36, the upper ends of the lifter bars 42 being always above the upper surface of the plate 36.

A rigid, horizontal plate 43a (Fig. 1) is supported by four vertical rods whose upper ends have screw-threaded engagement with threaded holes in the bed plate 36 and which pass through spacer sleeves 44. This plate 43a forms the lower head of and supports a cylinder 45 having the upper head 46. A piston (not shown) slides in the cylinder 45 and has a rod 47 having a platen 48 fixed to its upper end.

An airtight tank T (Fig. 1) is supported by a frame 49 (Fig. 2) resting on the base 20. A motor 50, mounted on the base 20, drives a hydraulic pump by means of belts 51, the pump being capable of delivering fluid from the tank at a high pressure, for example, a pressure of the order of 1000 p. s. i. From a four-way valve 53 a pipe 52 (Fig. 2) leads to the upper end of the cylinder 31, while a second pipe 52ª leads from the lower end of the cylinder back to the valve.

From a four-way valve 56, a pipe 54 leads to the lower end of the cylinder 38, and a second pipe 55 leads from the upper end of the cylinder 38 back to the valve.

A pipe 57 leads from a four-way valve 59 to the lower end of the cylinder 45, and another pipe 58 leads from the upper end of the cylinder 45 back to the valve. The valves 53, 56 and 59 are of conventional type, for example, such as disclosed in the patent to Conradson, 1,035,860, August 20, 1912. They may be so set that fluid delivered by the pump will flow from the delivery side of the pump to either end of the corresponding cylinder as desired. The tank contains a suitable liquid, for example oil. The valves are provided with handles 60, 61 and 62 respectively, for manual operation. A pipe 63 leads from the tank to a safety valve 64 of conventional type.

The platen 34 is provided with holes 66ª (Fig. 11) for the reception of bolts by means of which a heater block 66 (Fig. 1ª) is attached to the underside of the platen, the block housing conventional electrical heating coils, not shown. Current for energizing the coils may be supplied, usually through a flexible conductor, from any source convenient to the location of use of the machine.

To the underside of the heater block 66 a plate 67 is attached, and to the underside of this plate 67 the top or cover plate 68 (Figs. 1ª, 6, 7, 8 and 9) of the mold is attached. The mold is preferably of duplex type to make possible the molding of a pair of soles in the same operation, although it is contemplated that the mold employed may have a lesser or greater number of cavities if desired. As shown in Fig. 6, the top plate 68 of the mold has a flat undersurface 69 which borders the two sole-shaped areas 70 and 71 which may and, as here shown, have a surface design (in intaglio) such as is desired to appear on the bottom of the completed sole. As shown in Figs. 7 and 8, the undersurface of the top plate comprises portions disposed at different levels corresponding to the forepart and heel portion of the sole. However, it is obvious that if a sole of uniform thickness were desired, the entire lower surface of the top plate would be at the same level.

A heater block 71 (Fig. 1ª) similar to the block 66 is bolted to the upper surface of the bed plate or table 36. The bottom plate 72 of the mold normally rests on block 71. The lower member or frame 73 of the mold (Figs. 3, 3ª, 9 and 9ª) rests on plate 72. This frame defines the mold cavities 74 and 75. These cavities extend from the top to the bottom of the frame. As here illustrated (Fig. 9ª) the side wall of the frame is thicker at its lower part than at its upper part, with a horizontal ledge 76 at the junction of the upper and lower parts, the internal area defined by the lower part 77 being of a contour to receive, with a sliding fit, a corresponding plate 78 or 79, respectively. These plates have upper surfaces 80 (Fig. 5), which, in cooperation with the ledges 76 of the frame 73, provide, in intaglio, the contour of the desired upper surface of the sole to be molded. Each plate 78 and 79 is provided with two actuating rods 82 and 83, respectively (Fig. 8), which extend down with a sliding fit through holes in the plate 72, the heater block 71 and bed plate 36, and rest at their lower ends on the platen 48. The plate 67 to which the top member of the mold is attached is provided (Fig. 1ª) with downwardly directed dowels 84 and 85 respectively, which are designed to cooperate with complemental dowels 86 and 87 carried by the bottom plate 72 on which the frame 73 of the mold rests, thereby to insure proper registration of the top plate with the frame. Preferably the dowels 86 and 87 are of downwardly yieldable type so that the engagement of the dowels will not interfere with the proper closure of the mold. Additional dowels may be provided if it is found necessary to insure the proper registration of the mold parts.

The upper portions of the lifter rods 42 (whose lower ends rest on the platen 41) pass through aligned openings in the bed plate 36, the heater block 71 and bottom plate 72, the ends of these rods being located directly beneath the members 78 and 79 of the mold, so that if the platen 41 be elevated the members 78 and 79 will rise.

Figure 2:
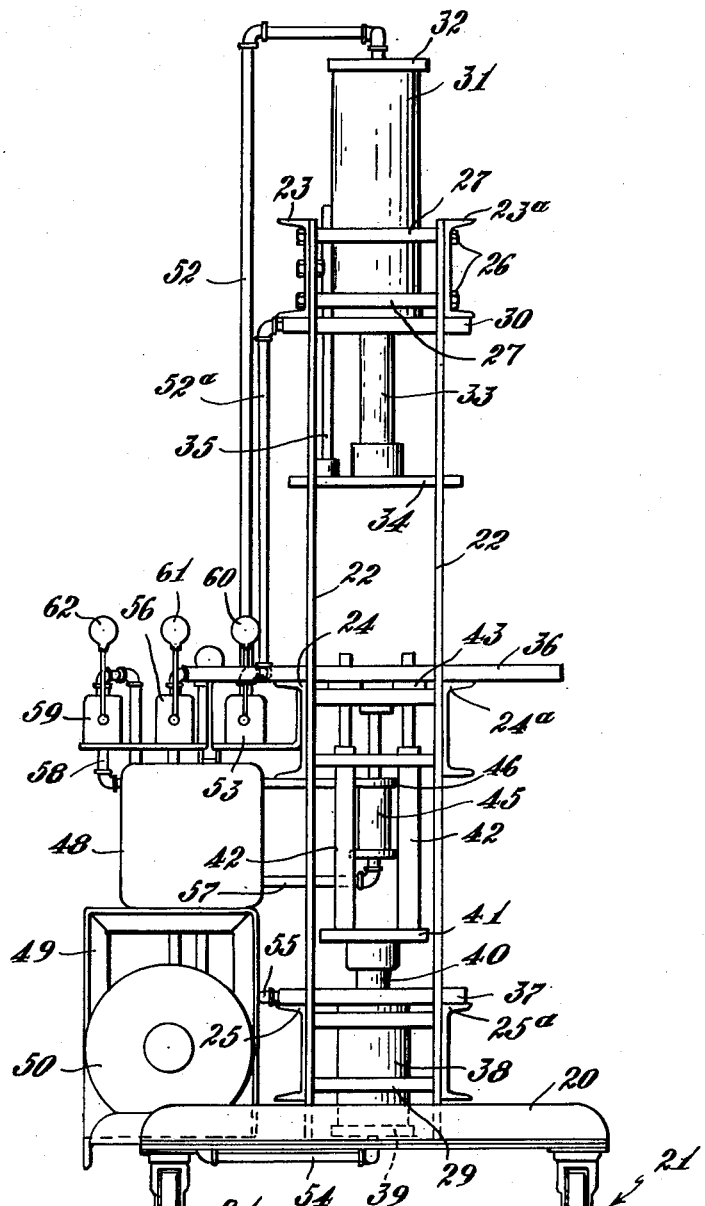
Fig. 2 is a side elevation of the apparatus of Fig. 1, viewed from the left-hand side of Fig. 1.

The operation of the apparatus is substantially as follows, it being understood that the parts are in the position illustrated in Figs. 1 and 2, but with the mold members attached to the platen 34 and the plate 36, as illustrated in Fig. 1ª. A suitable quantity R (Fig. 1ª) of the rubber compound, (which may be in pelleted form or in a biscuit thereby to facilitate the provision of an accurately uniform amount), is deposited within each of the mold cavities in the frame 73. The valve 60 is now so manipulated as to admit fluid pressure to the upper end of the cylinder 31, thus causing the platen 34 to descend until the top plate 68 of the mold rests upon the upper edge 73ª of the frame 73, with a predetermined pressure dependent upon the area of the piston in the cylinder 31 and the pressure which is maintained by the pump, the valve 60 being then positioned to maintain this pressure.

With the top plate 68 thus firmly held against the frame 73 the valve handle 61 is so manipulated as to admit fluid pressure to the lower end of the cylinder 38, thus raising the platen 41 and by means of the rods 42 exerting upward pressure against the members 78 and 79, the amount of elevation of the platen 41 and therefore the final thickness of the sole being determined by the placing of spacer elements 42ª on the upper ends of the rods 42. Since at this time the top member 73 is held firmly against the upper edge 73ª of the mold frame, the rubber R within the mold cavities is subjected to pressure by the rise of members 78 and 79 and caused to assume the shape of the mold cavities. Having thus raised the members 78, 79 to the proper position for molding, the handle 61 is placed in position to maintain this pressure, the parts remaining in this position for a period sufficient to vulcanize the rubber compound to the desired degree, it being noted that the mold parts have been heated by the blocks 66 and 71.

The valve handles 60 and 61 are now so manipulated as to release the pressure at the upper end of the cylinder 31 and to admit pressure to the lower end of said cylinder, and to raise the platen 34 and the top plate of the mold, and at the same time releasing pressure from the lower end of the cylinder 38 and admitting pressure fluid to its upper end, thereby moving the platen 41 downwardly.

The handle 62 is now so manipulated as to admit pressure to the lower end of the cylinder 45, thus raising the platen 48 and causing the rods 82 and 83 to move the plates 78 and 79 upwardly, thus discharging the molded soles from the mold cavity.

As above noted, the apparatus herein described is particularly designed for the preparation of rubber soles in such a way that it is not necessary to subject them to a roughening operation preparatory to their attachment to the shoe bottom. Thus, for example, in the use of this apparatus, pelleted rubber compound of a conventional composition such as is customarily used in making rubber shoe soles is placed in the mold cavity as illustrated at R (Fig. 1ª), and by operation of the cylinders 31 and 38 the mold parts are caused to approach each other so as to compress this mass of rubber within the mold cavity, the pressure exerted on the rubber being for example, of the order of 800 p. s. i. and the period of pressure approximating from ½ to 10 seconds with the mold parts at a temperature of between 175° and 195° F. At the end of this period the platens 34 and 37 are moved away from each other, and immediately thereafter the platen 48 is elevated so that the plates 78 and 79 eject the molded material from the mold cavities. This molded mass, which may be referred to as an "embryo sole," is only partially cured and still tacky, although it is cured sufficiently so that it may be handled without destroying its molded shape. Because the upper part of the mold cavity is of greater horizontal dimension than the plate 80 or 81, the molding pressure squeezes some of the rubber compound down around the edge of the plate 80 or 81 until it contacts the ledge 76, thus providing the sole with a raised marginal flange on its upper surface. If this flange is not desired the mold cavity may be of the same horizontal dimensions from top to bottom. In accordance with a desirable procedure, this embryo sole, after ejection from the mold cavity is treated on that face which is to be the bottom of the shoe and on its lateral edges with a reagent in the nature of a rubber accelerator which further vulcanizes these surfaces to form a thin but tough external layer which serves to retain the shape of the sole while being handled and until vulcanization has been completed. Obviously, such accelerator might be introduced into the substance of the embryo sole at the proper locations prior to molding. That surface of the embryo sole which is not thus treated with the vulcanizing agent retains its original somewhat tacky condition, and if applied directly to the bottom of a lasted shoe, particularly with interposed cement, provides a very permanent bond between the sole and the lasted shoe when the assembled parts are subjected to a vulcanizing treatment such as to complete the vucanization of the sole. Thus, the customary roughening operation is made unnecessary.

Because the machine is readily movable from place to place on its casters 21, and because it occupies but little floor space, it is readily possible to locate the machine at the most convenient place in the shoe factory, for example, closely adjacent to the station at which the soles are assembled with the lasted shoes. This eliminates the necessity for storage and speeds up the shoe making operation. Since the power requisite to operate the machine and the energy for heating the molds is electrical, it is only necessary for the proper operation of the machine that there be an electrical outlet within a reasonable distance of the machine's position from which current may be obtained for operating the motor and the heating elements.

Although the apparatus herein disclosed provides but a single unit, that is to say, means for operating a single duplex mold, it is contemplated that the apparatus may be built to accommodate two or more such units mounted on the same base and operated by the same motor and pump, thus providing for more rapid production.

The apparatus as herein described with its upper and lower cylinders 31 and 38 is highly desirable, since by moving the upper and lower mold parts in opposite directions the time necessary to close the mold and apply the pressure is substantially reduced, as compared with an arrangement wherein one of the mold parts is stationary and the entire motion necessary to close the mold and apply the pressure is accomplished by one of the mold elements. However, it is to be understood that certain of the advantages of the present invention may be obtained in apparatus wherein only one of the mold parts is movable.

While a certain desirable embodiment of the invention has herein been disclosed by way of example, it is to be understood that the invention is broadly inclusive of any and all modifications falling within the scope of the appended claims.

I claim:

1. In combination, in apparatus designed for use in forming rubber shoe soles, a rigid horizontal mold-supporting table, a rigid mold frame mounted on the table, the mold frame having an opening therethrough from top to bottom whose edge wall conforms to the contour of the sole to be formed, a cover for the frame having a lower surface which in reverse is a replica of the bottom surface of the desired sole, the cover being of such horizontal extent that it may rest upon the upper edge of the mold frame and completely close the opening at its top, a bottom plate whose edge is contoured and dimensioned so that the plate may fit within the lower part of the opening in the mold frame while resting on the upper surface of the table and thereby form a floor for a mold cavity whose side wall is provided by the frame and whose top wall is the cover plate, means for moving the cover plate downwardly into contact with the upper surface of the frame and for holding it in contact with the frame under heavy pressure, means for moving the bottom plate upwardly in the opening in the mold frame for a predetermined distance thereby to conform moldable material resting on the bottom plate to the shape of the mold cavity and to a predetermined thickness, and means operative to move the bottom plate further up in said opening in the frame after the cover has been raised thereby to eject the formed sole from the opening in the frame.

2. The combination according to claim 1, wherein the means for raising the bottom plate for conforming the molded material to the mold cavity comprises a hydraulic cylinder whose axis is vertical and which is located below the table, a piston in said cylinder, a piston rod projecting upwardly from the piston, a horizontal platen fixed to the upper end of the piston rod, a plurality of rigid lifter rods vertically slidable in fixed guides and which extend upwardly through openings in the table and whose lower ends rest on said platen.

3. The combination of claim 1, further characterized in that the means for raising the bottom plate to eject the formed sole from a mold cavity comprises rigid lift pins projecting downwardly from the bottom plate, a hydraulic cylinder whose axis is vertical and which is located below the table, a piston in said cylinder, a piston rod extending upwardly from the piston and a horizontal platen carried by the piston rod which is engageable with the lower ends of said lift pins thereby to raise the bottom plate to a height sufficient to eject the molded sole from the cavity.

4. The combination of claim 1, further characterized in that the wall of the mold frame is thicker at its lower portion than at its upper portion with a horizontal ledge at the junction of the upper and lower portions, said ledge being located at a distance above the top surface of the table equal to the thickness of the bottom plate so that the upper surface of the bottom plate is in the same plane as said ledge when the bottom plate is resting on the table, whereby when the bottom plate is raised in performing the molding operation the moldable material is squeezed outwardly and downwardly about the edge of the bottom plate thereby providing the molded sole with an upstanding flange at its upper surface.

5. The combination of claim 1, further characterized in that the mold frame varies in vertical depth with a corresponding variation in the depth of the opening therein, the deepest point being at that end of the mold cavity wherein the heel end of the sole is to be formed, the cover having a substantially horizontal upper surface but varying in vertical depth, with its lower surface so shaped that the formed sole will be of substantially uniform thickness at its fore part portion and of a greater thickness at its heel end.

6. The combination of claim 1, further characterized in that the upward and downward motion of the cover is effected by a hydraulic cylinder whose axis is perpendicular to the table and within which there is a piston provided with a piston rod which extends downwardly and to which the cover is attached, and means operative to prevent rotation of the piston rod thereby to keep the cover in proper position of orientation relatively to the mold frame.

7. The combination of claim 1, further characterized in that the means for moving the cover comprises a hydraulic cylinder whose axis is perpendicular to the table, a piston within the cylinder having a piston rod which extends downwardly, a platen fixed to the lower end of the piston rod, a heater block secured to the underside of the platen, and means for attaching the cover to the underside of the heater block, and the means for moving the bottom plate comprises two coaxial hydraulic cylinders disposed below the table, one of said cylinders being of larger diameter than the other, the smaller cylinder being located nearer the table, each cylinder having therein a piston and each having a piston rod extending upwardly from its piston, a platen secured to the upper end of the piston rod of the larger cylinder, said platen being located below the lower end of the smaller cylinder, a plurality of vertically slidable lift rods having their lower ends resting on said last-named platen and extending up through openings in the table with their upper ends disposed below the bottom plate, the piston rod of the smaller cylinder also having a platen at its upper end, and rigid lift pins fixed at their upper ends to the bottom plate and which project down through openings in the table, with their lower ends in contact with the platen carried by the piston rod of the smaller cylinder.

References Cited in the file of this patent

UNITED STATES PATENTS

| | | |
|---|---|---|
| 1,925,050 | Jagdmann et al. | Aug. 29, 1933 |
| 2,437,127 | Richardson | Mar. 2, 1948 |

FOREIGN PATENTS

| | | |
|---|---|---|
| 640,366 | Great Britain | July 19, 1950 |